United States Patent
Scharkowski (10) Patent No.: US 10,998,645 B2
(45) Date of Patent: May 4, 2021

(54) CONNECTOR AND METHOD OF MANUFACTURING A CONNECTOR

(71) Applicant: Auto-Kabel Management GmbH, Hausen i.W. (DE)

(72) Inventor: Oliver Scharkowski, Zell im Wiesental (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 16/618,278

(22) PCT Filed: Mar. 21, 2018

(86) PCT No.: PCT/EP2018/057123
§ 371 (c)(1),
(2) Date: Nov. 29, 2019

(87) PCT Pub. No.: WO2018/219515
PCT Pub. Date: Dec. 6, 2018

(65) Prior Publication Data
US 2020/0153124 A1    May 14, 2020

(30) Foreign Application Priority Data

Jun. 1, 2017  (DE) .................... 10 2017 112 123.4
Jul. 26, 2017  (DE) .................... 10 2017 116 879.6

(51) Int. Cl.
*H01R 4/02*    (2006.01)
*H01M 2/20*    (2006.01)
(Continued)

(52) U.S. Cl.
CPC ............ *H01R 4/023* (2013.01); *H01M 2/206* (2013.01); *H01R 11/12* (2013.01); *H01R 43/02* (2013.01); *H01M 2220/20* (2013.01)

(58) Field of Classification Search
CPC ....................................................... H01R 11/12
(Continued)

(56) References Cited

U.S. PATENT DOCUMENTS 2,074,810 A    3/1937  Sabol
3,181,110 A *  4/1965  Waters ................... H01R 4/185
                                                    439/868
(Continued)

FOREIGN PATENT DOCUMENTS

CN    1065355 A    10/1992
CN    1759506 A    4/2006
(Continued)

OTHER PUBLICATIONS

European Patent Office, International Search Report and Written Opinion of the International Searching Authority, Application No. PCT/EP2018/057123, dated Jun. 8, 2018, (with English translation of the International Search Report, 15 pages.
(Continued)

*Primary Examiner* — Phuong K Dinh
(74) *Attorney, Agent, or Firm* — Sunstein LLP (57) ABSTRACT

Flexible connector having a multilayer metallic strip, at least one connecting element arranged at at least one end of the strip, the layers of the metallic strip being bond one another in the region of the end of the strip.

14 Claims, 8 Drawing Sheets

(51) Int. Cl.
*H01R 11/12* (2006.01)
*H01R 43/02* (2006.01)

(58) Field of Classification Search
USPC .................. 439/512, 801, 66, 868, 504
See application file for complete search history.

(56) References Cited

U.S. PATENT DOCUMENTS

| | | | | |
|---|---|---|---|---|
| 3,706,955 | A | * | 12/1972 | Bunnell ............... H01B 7/0009 439/512 |
| 4,394,533 | A | * | 7/1983 | Naito ................... B23K 11/364 156/50 |
| 5,071,368 | A | * | 12/1991 | Garritano ............. H01R 11/288 439/495 |
| 5,154,646 | A | * | 10/1992 | Shoup .................. H01M 2/206 439/502 |
| D400,169 | S | * | 10/1998 | Endo ............................. D13/120 |
| 7,232,348 | B2 | * | 6/2007 | Renaudin ............... H01R 11/26 439/801 |

FOREIGN PATENT DOCUMENTS

| | | |
|---|---|---|
| DE | 44 39 645 C1 | 4/1996 |
| DE | 10 2010 013 351 A1 | 12/2011 |
| DE | 20 2011 000 930 U1 | 1/2014 |
| DE | 10 2013 208 203 A1 | 11/2014 |
| DE | 11 2014 006851 T5 | 5/2017 |
| JP | H02-95187 U | 7/1990 |
| WO | WO 2015/111509 A1 | 7/2015 |

OTHER PUBLICATIONS

European Patent Office, International Preliminary Report on Patentability, Application No. PCT/EP2018/057123, dated Apr. 30, 2019, with English translation, 23 pages.
German Patent Office, Office Action, Application No. 10 2017 116 879.6, dated Jan. 24, 2018, 8 pages.
China National Intellectual Property Administration, First Office Action, Application No. 201880044595.7, dated Oct. 12, 2020, 11 pages (English translation).

* cited by examiner

CONNECTOR AND METHOD OF MANUFACTURING A CONNECTOR

CROSS-REFERENCE TO RELATED APPLICATIONS

This application is the national phase entry of international patent application no. PCT/EP2018/057123 filed Mar. 21, 2018 and claims the benefit of German patent applications No. 10 2017 112 123.4, filed Jun. 1, 2017 and No. 10 2017 116 879.6, filed Jul. 26, 2017, the disclosures of which are incorporated herein by reference in their entirety.

TECHNICAL FIELD

The article relates to a connector and a method of manufacturing a connector, in particular a plug connector or a battery cell connector.

BACKGROUND ART

Connectors, which must be highly flexible, are used for contacting individual cells in a battery pack or for interconnecting battery packs. The contacting of individual cells in a battery pack for electric vehicles must be flexible in order to compensate for any differences in height between the individual cells. The cell connectors are used in very large numbers in a battery pack, since the respective cells have to be connected to each other and a very large number of cells are used in battery packs for electric vehicles. For this reason, it must be possible to manufacture the cell connectors in as fully automated a process as possible in order to keep production costs low. The same also applies to high-voltage connectors, for which flexibility is of decisive importance in order to ensure simple assembly of the connector, which usually consists of two parts.

It has been found that multi-layer metallic strips can be used for such connectors. Multi-layer metallic strips are understood in the following as braids, braided strips as well as laminates. In particular, copper braids and copper laminates, so-called busbars, are used and can also be used. A copper braid is made of very thin copper strands which are intertwined or interwoven with each other. These form a highly flexible conductor which can be rolled and thus provided as copper braid strip. The individual strands have a diameter of 0.1 mm and smaller. The individual strands are therefore extremely thin and the current carrying capacity of the copper braid strip is only possible due to the large number of individual strands which are interwoven with each other. In a laminated copper strip, the individual layers are formed from copper strips. When we talk about sheets in the following, we also mean foils. The sheets or foils usually have a thickness of only 0.1 mm and less.

Due to these extremely low material thicknesses, however, the multi-layer strips are problematic with regard to contacting with connecting parts. In order to make this contacting possible, connecting elements are arranged on the strips. However, the connecting elements must be bonded to the strip. In these joining processes, especially in thermal joining processes, the joining partners are damaged by the energy input. When a braided strip is used, metal flakes are produced which can detach from the bond. Especially in battery applications, however, such metal flakes must be avoided, as short circuits caused by them can cause the greatest damage.

It has already been proposed that the metallic strips be metallically coated at the ends, in particular tin-plated in an immersion bath. A connecting eye can then be punched into the strip as a connecting element.

However, even such connecting lugs usually do not offer sufficient strength, as they are inserted directly into the material of the strip and thus the extremely thin layers of the strip.

It has also already been proposed to coat the individual layers (also known as individual strips), in particular with tin, in order to subsequently join the strips together mediated by the tin layer. In this process, energy is introduced into the laminate so that the coating melts and an intermetallic bond is formed along the coating. This, however, results in an unpurified compound, which may be disadvantageous electrically or in terms of durability.

A bonding of several layers of strips directly in order to obtain a laminated copper strip is also problematic, since in the bonding processes considerable welding energy has to be introduced into the two outer, opposing layers of the strip in order to reliably bond all layers together. This considerable welding energy can cause one or more outer layers to tear off or burn. Furthermore, hardening can occur and thus embrittlement of the joining partners.

For this reason, the subject matter was based on the object of providing a flexible connector which can be manufactured cost-effectively and at the same time provides sufficient strength for connection to electrical components.

SUMMARY OF THE INVENTION

It has been found that at least one, preferably both ends of the metallic strip are provided with at least one, preferably at least two reinforcing elements. The reinforcing element may be provided in the form of sheets or flat conductors. The reinforcing element can be in two parts and placed on the opposite sides or surfaces of the strip. The parts of the reinforcing element are then bonded together with the strip. A welding knot is formed at the end of the strip, which is formed by the individual layers of the metallic strip and the parts of the reinforcing element. The individual layers of the strip include individual layers of a laminate as well as individual strands of a braid. The reinforcing element can also only be a single piece. Then the reinforcing element can rest on a surface of the strip. In particular, the reinforcing element is on the surface which is processed with the sonotrode. Thus the reinforcing element is placed between the surface of the strip and a sonotrode. This leads to the desired protection of the strip while at the same time optimizing the use of materials.

The reinforcing element can also be formed from an outer layer of layers, i.e. an outer layer or parts thereof. Then the outer layer of the strip can be formed with a greater material thickness than the layers inside the strip. In particular, the layer thickness of the layer forming the reinforcing element can be at least 1.5 to twice the thickness of an inner layer.

The reinforcing element is preferably made of sheets or flat conductors or plates. A first part of the reinforcing element is placed on the strip and if necessary a second part of the reinforcing element is placed under the strip. Then, by means of a joining process, for example ultrasonic welding, resistance welding, soldering or the like, a bond, in particular a single welding knot, is produced from the upper part and the lower part of the reinforcing element and the intermediate layers of the strip.

The connection geometry can then be punched out of the welding knot, cut and tension-formed. In addition, a connection element, such as a connection eye, can be inserted into the reinforcing element and the end of the strip, for example by punching or cutting.

Due to the reinforcing element, the connecting element, in particular the connecting eyelet, has an increased pull-out force compared to a strip without such a reinforcing element. The pull-out force can be defined by a suitable selection of the material thickness of the parts of the reinforcing element. In particular, the material thicknesses of the parts of the reinforcing element can be greater than the material thicknesses of the individual layers or strands of the strip.

As already explained, it is proposed that the multi-layer strip is a multi-layer laminate or braid. Once again it should be mentioned that multi-layer in the sense of this application means both a laminate and a braid. Even in a braid, the individual strands lie on top of each other and are multi-layered.

According to an embodiment, it is proposed that the strip or its layers is made of copper, a copper alloy, aluminium or an aluminium alloy. Copper strips are particularly suitable as they have a particularly high conductivity. Other metals such as non-ferrous metals, semi-precious metals or precious metals are also possible. The reinforcing element can also be made of copper or a copper alloy or aluminium or aluminium alloy. In particular, it has been found that the parts of the reinforcing element may be made of a copper alloy, particularly brass. However, it is also possible that the reinforcing element may be made of another metal, in particular non-ferrous metal, semi-precious metal or precious metal.

As mentioned, the reinforcing element is made of one or two parts. The reinforcing element can be made of metal sheets. Sheets can be provided continuously or discontinuously in the form of platelets or flat conductors. The sheets can be placed on opposite surfaces of the strip. The two sheets are then joined with the materials of the strip in between to form a single knot, in particular a welding knot, or only one sheets with the strip to form a single knot, in particular a welding knot.

It is also possible for a solid conductor, in particular a flat conductor, to be embraced by a strip. The strip can then be welded to the conductor, possibly using the reinforcing element. The reinforcing element can completely grip the strip. A strip of this type is particularly suitable for flexibly connecting two conductors made of solid material. The strip can grip one end of a conductor at a time. The reinforcing element can then be placed around the respective ends or it may already be present through an outer layer of the strip. The respective end of the conductor can be connected to the strip in the way shown here. The two conductors are then flexibly connected to each other by the strip. The strip can be formed as a hose. The strip can be made of a braid. A front end of a conductor can thus be embraced by the strip. The cables can also be plugged into the hose.

To define the pull-out forces, it can be useful select the material thicknesses of the two parts of the reinforcing element differently. In particular, it can happen that different forces occur on the two opposite sides of an eyelet as a connecting element, which can be compensated by different material thicknesses of the parts of the reinforcing element.

It is proposed that at least part of the reinforcing element is formed as a shell. The shell-shaped element can be in the form of a cable lug. The shell-shaped element can be bent up at two lateral edges and at the remaining frontal edges the element can remain flat. The strip can then be inserted into the shell-shaped element via an open, flat edge. The lateral bent edges of the element can be used laterally as a stop for the end of the strip. The bowl-shaped element can be bent up at three edges and the element can remain flat at a fourth remaining edge. The strip can then be inserted into the shell-shaped element via this open, flat edge. The bent edges of the element can serve as a stop for the end of the strip both on the side and on the front.

It is preferable if the parts of the reinforcing element are formed as shell-shaped elements and thus take up the end of the strip in the manner of a sleeve. However, it is also preferred if only one shell-shaped element is provided and if necessary a second part of the reinforcing element is formed as a flat strip. In the first case, with two shell-shaped elements, the bent edges are in particular such that the height of the edges corresponds to about half the height of the strip. If only one shell-shaped element and a corresponding flat strip are provided, the bent up edge is shaped in particular in such a way that its height corresponds approximately to the material thickness of the strip. Then the strip can be placed on the opposite side of the strip to the shell-shaped element and lie directly against the bent edges. In the case of two shell-shaped elements, the respective bent edge surfaces lie on top of each other.

The parts of the reinforcing element are joined together. If a shell-shaped element is present, a connection is created in particular at the bent edges, in particular at the edge surfaces. It is possible that the edge surfaces of two shell-shaped elements are connected to each other or that an edge surface of a shell-shaped element is connected to a surface of a metal strip.

The reinforcing element can project beyond the end of the strip at the side and/or frontal edge. For example, it is possible for the reinforcing element to form a connecting lug at the same time. This can protrude from the frontal edge or side of the strip end. In this case, one part of the reinforcing element in particular is formed with a material thickness at least 5 times, preferably 10 times, greater than the other part of the reinforcing element. In particular, the shell-shaped element can be connected to a strip metal which projects beyond the front end or laterally beyond the strip and which has a considerably greater material thickness than the shell-shaped element. The strip with the greater material thickness can then simultaneously serve as a connecting lug. A connecting eyelet can be inserted into this part of the reinforcing element projecting beyond the end of the strip, in particular it can be punched.

According an embodiment, it is proposed that in a central area it is welded with a distance to its lateral edges and/or its frontal edge pointing away from the strip. Thus the reinforcing element is free of welding seams on three edges. The edge pointing in the direction of the strip is welded to the outer edge of the strip.

As already explained, the connection element can be a connection eye. This is particularly suitable for holding connecting bolts, screws or rivets. The eyelet can be formed by an opening through the strip and the opposite parts of the reinforcing element. The opening can be circular. It is also possible that the opening can have different circumferential diameters, in particular square or hexagonal.

A particularly flexible use of a connector according to the subject matter is possible if it is not only equipped with reinforcing elements at its distal ends, but also if at least one further reinforcing element is arranged between the two distal ends of the strip. This additional reinforcing element can be formed according to a previously described reinforcing element which is arranged at the end of the strip. Thus, a flexible connection with high pull-out forces can also be achieved in the course of the connector.

At least one part of a reinforcing element can extend transversely to the longitudinal extension of the strip beyond a lateral edge of the strip. In particular, such a part of the reinforcing element may extend beyond the lateral edge of the strip perpendicular to the direction of longitudinal extension. It is also possible that reinforcing elements spaced apart in the longitudinal direction extend beyond different lateral edges of the strip. A first part of a first reinforcing element may extend over a first lateral edge and a first part of a second reinforcing element may extend over a second lateral edge opposite the first lateral edge. The respective reinforcing elements can alternate so that intermittently times a part of a reinforcing element extends beyond the first lateral edge and subsequently a part of a reinforcing element extends beyond the second lateral edge.

It is also possible to join connecting or socket pins to the reinforcing elements of the distal ends and to any reinforcing elements between the distal ends using a joining process such as ultrasonic welding, resistance welding, friction welding or the like.

Another aspect is a process for manufacturing a connector. In this process, a multi-layer metallic strip is preferably provided as an endless strip. For example, a strip can be unwound from a coil. A strip can also be unwound from a roll or the like. Of course, the strip is not endless, but extends over a considerably greater length in relation to the longitudinal extension of the connector, in particular the endless strip is 100 times, 1000 times or more longer than the connector.

The strip is fed to a joining device and a part of each reinforcing element is pressed against the strip on one side of the strip or one surface of the strip. The parts are then joined to the strip in a material-locking manner and, after welding, the welded strip is removed from the joining device.

The advantage of both the connector and the process lies in the fact that no metal flakes are produced. The joining tools have no direct contact with the layers of the strip, especially the strands or the individual foils or strips. This ensures reliable, long-term stable contacting.

For contacting with connecting parts, it is possible either to insert a connecting element, in particular a connecting eyelet, into the reinforcing element or to make contact with other connecting elements by means of a contacting process, in particular a material-locking contacting process, for example ultrasonic welding or resistance welding or soldering.

Another joining process that can be used is laser welding or electromagnetical pulse welding. It is also possible to cut the connection eyelet out of the reinforcing element using a laser. The parts of the reinforcing element can be rectangular. It is also possible that the edges of the reinforcing element are connected by large radii. In particular, a reinforcing element can be formed in a plan view, for example also U-shaped or O-shaped.

The connectors can be separated either directly in the joining device, especially during or after the material-locking connection, or after the strip has been removed from the joining device. Separation may be carried out by cutting or punching.

Particularly in an endless process, an arrangement of the reinforcing elements at the two distal ends of the connector is particularly well possible if the reinforcing element is applied to the strip during joining and, in particular, two connecting elements are provided in the reinforcing element. The strip can then be cut in the middle of the reinforcing element, especially between the connecting elements, either during or after joining or outside the joining device. The strip cut in this way then has a reinforcing element and, in particular, a connecting element on both sides of the joint.

According to an embodiment, it is proposed that a plurality of strips are first fed to a joining device in layers one on top of the other. These strips will also be made available in an endless strip.

The two outer strips are preferably intended as parts of the reinforcing element. First, these outer strips, which have a higher, in particular at least 5 times, preferably at least 10 times the material thickness than the inner strips (which are e.g. foil-shaped), are cut through and alternately one strip is removed on each side (surface). Thus, on each side of the stacked strips an area is created with an outer layer of the outer strip and a layer without the outer strip. The remaining outer strips lie in longitudinal extension of the strip at the same positions of the strip so that they face each other.

The strip can then be bonded to the remaining outer strips so that the remaining strips form the parts of the reinforcing element.

Finally, the strip can be cut in the joined area. After cutting, the reinforcing element formed by the outer strips lies on both sides of the cutting point.

Lateral limiters are provided in particular to prevent strands or layers of the strip from sliding out of the parts of the reinforcing element during the joining process. These lateral limiters prevent the layers of the strip from pressing out on the sides. Such a joint space limitation, in particular a welding space limitation, is carried out by the lateral limiters. In particular, these have a distance to each other so that a gap with a dimension between 1 mm and 0.02 mm, in particular 0.04 mm, is formed on both sides of the joining tool, in particular a sonotrode. This results in a gap between the joining tool, in particular the sonotrode, and the lateral limiters during the joining process, whereby this gap is preferably not larger than 1 mm and in particular lies between 1 mm and 0.02 mm, in particular 0.04 mm.

BRIEF DESCRIPTION OF THE DRAWING

In the following, the subject matter is explained in more detail using a drawing showing embodiments. In the drawing show.

DETAILED DESCRIPTION OF SPECIFIC EMBODIMENTS

Figure 1A:
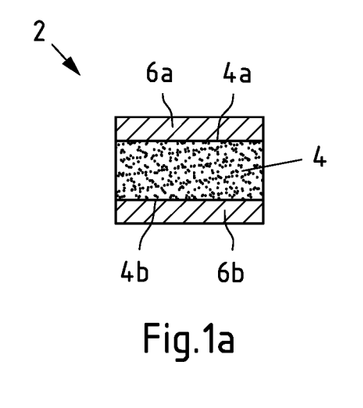
FIG. 1a-c Cross sections through strip ends of connectors.

FIG. 1 a shows a cross-section of a strip end 2 of a connector formed of a multi-layer metallic strip 4. In the figures, the metallic strip 4 is shown both as a laminate and as a braid. For the sake of clarity, the figures are not shown for both laminates and braids. All figures apply to laminates or braids in the sense of a multi-layered strip. Both laminates and braids are to be understood as a multi-layered strip 4.

In the area of the end of the strip, strip 4 is arranged between two parts 6a, 6b of a reinforcing element 6. It can be seen that the parts 6a, 6b are arranged on the surfaces of the upper side 4a and the lower side 4b of the strip 4. The parts 6a, 6b are joined to the surfaces on top 4a and bottom 4b. One joining method, for example, is ultrasonic welding. Resistance welding, laser welding or soldering can also be used.

Strip 4 is preferably made of copper. Other metals, as described above, are also possible. Parts 6a, b are preferably made of brass, other metals or alloys as described above are also possible. It is possible that the parts 6a, b are formed as flat parts, especially as flat strips. The surfaces of parts 6a, b facing strip 4 are bonded to strip 4. A compact welding knot is formed in the area of the end of strip 2 when parts 6a, b are welded to strip 4.

Figure 1B:
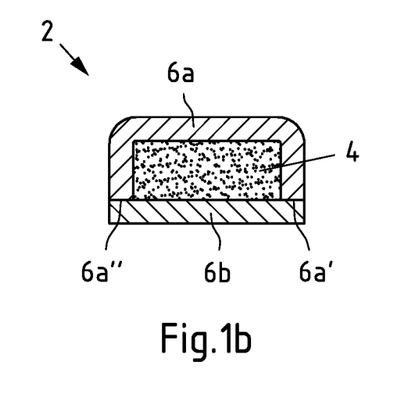

FIG. 1b shows another example of a strip end 2 where a first part 6a is formed as a shell-shaped element. The bent edge surfaces 6a', 6a" facing part 6b are joined to part 6b by a material bond. Here, too, strip 4 or the layers or strands present in it are compacted and bonded to parts 6a, 6b, in particular welded.

Figure 1C:
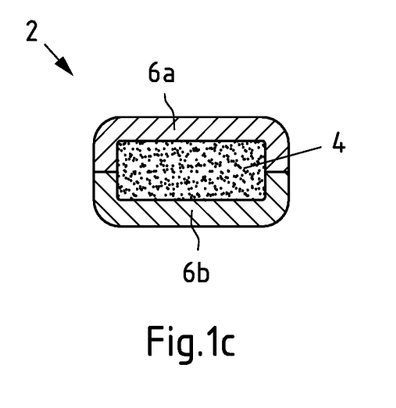

FIG. 1c shows another example of a strip end 2 of a connector. In this example the two parts 6a, b are shell-shaped. The edges of parts 6a, b, which are bent towards each other, are joined together at the edge surfaces. Here, too, strip 4 is compacted between parts 6a, b and joined to parts 6a, b by a material bond.

Figure 2A:
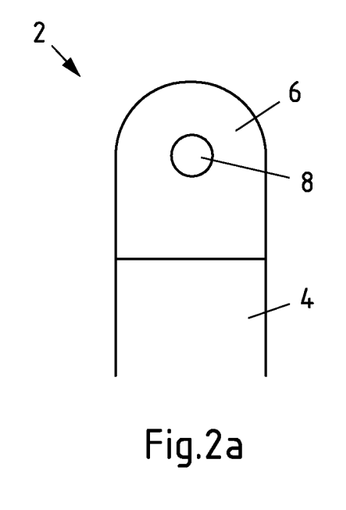
FIG. 2a-c Top views of the strip ends of connectors.

FIG. 2a shows a top view of one end of the strip. It can be seen that the reinforcing element 6 is rounded on the end face, in particular semicircular. In the centre of the reinforcing element 6 there is a receiving element 8 in the form of a receiving eyelet.

Figure 2B:
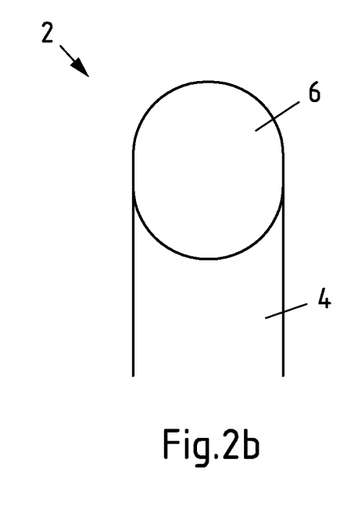

FIG. 2b shows another embodiment of a strip end 2 of a connector. Here it can be seen that the reinforcing element 6 is rounded at its two distal ends, in particular semicircular.

Figure 2C:
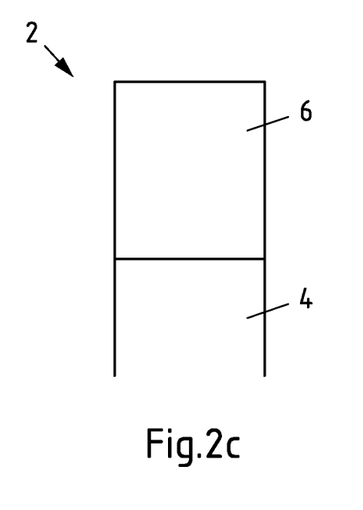

FIG. 2c shows another example of a strip end 2 of a connector. Here the reinforcing element is rectangular in shape.

Figure 3A:
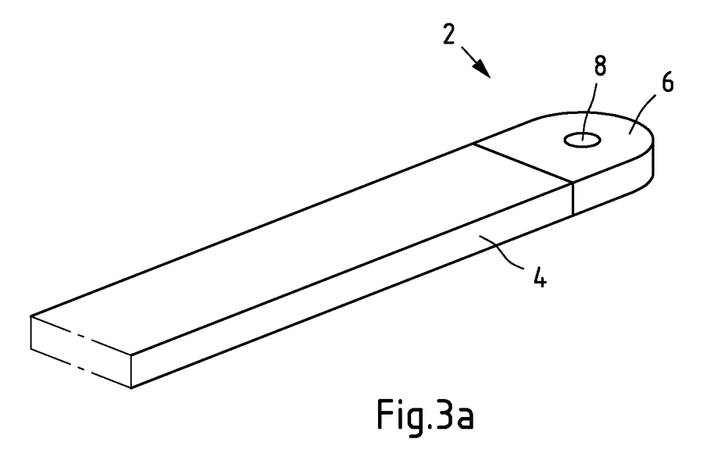
FIG. 3a-c Variants of connectors.

FIG. 3a shows a partial view of a strip end 4 of a connector. It can be seen that the reinforcing element 6 with the receiving element 8 is arranged at the end of strip 4. The receiving element 8 is arranged here as an opening. The reinforcing element 6 prevents the outer layers or strands of the strip 4 from being damaged or torn off when the parts 6a, b are connected to the strip 4 in a material-locking manner.

Figure 3B:
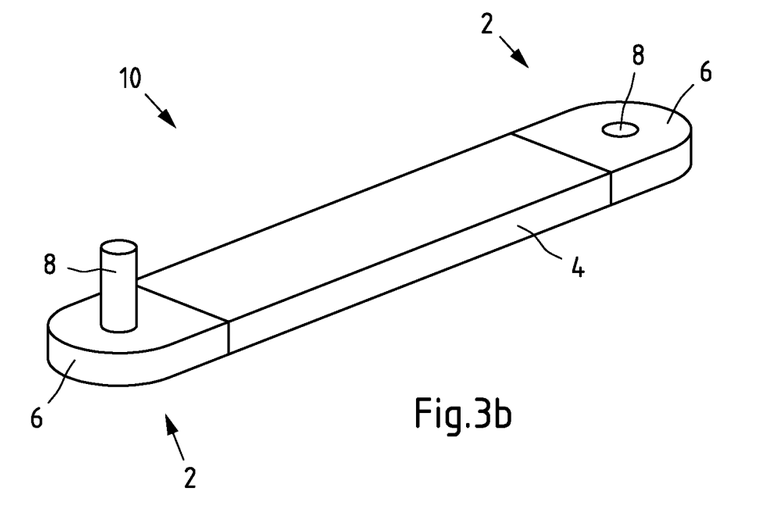

FIG. 3b shows another example of a connector 10. Connector 10 is provided with a reinforcing element 6 at each of its two strip ends 2. Here it can be seen that a receiving element 8 can also be formed as a bolt which is attached to the reinforcing element 6.

Figure 3C:
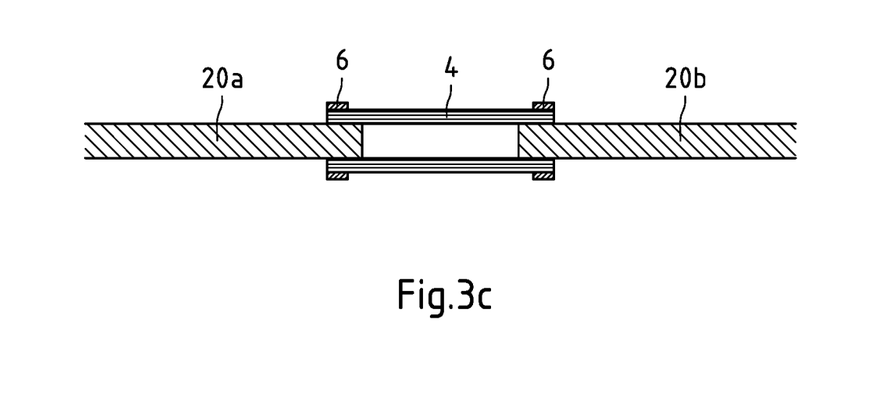

FIG. 3c shows another embodiment of a connector 10. Two cables 20a, b, for example flat cables, each made of solid material, are provided. Cables 20a, b can be made of copper, copper alloys, aluminium, aluminium alloys or similar.

Cables 20a, b are each surrounded by a strip 4 at one end. Strip 4 can be a braided strip. Strip 4 can fully encompass conductors 20a, b. Strip 4 can be formed as a hose. The cable 20a, b is stripped at the end so that in a stripped area, the strip 4 embraces the conductors 20a, b. The cable 20a, b can be formed as a hose. The cables 20a, b can also be plugged into the hose.

A reinforcing element 6 can be placed around the strip in each case. The reinforcing element 6 can be provided at least in the area of a weld seam, in particular the reinforcing element 6 can encircle the strip 4 in the area of the front end of the respective cables 20a, b. The reinforcing element 6 can be placed at least in the area of a weld seam.

Figure 8A:
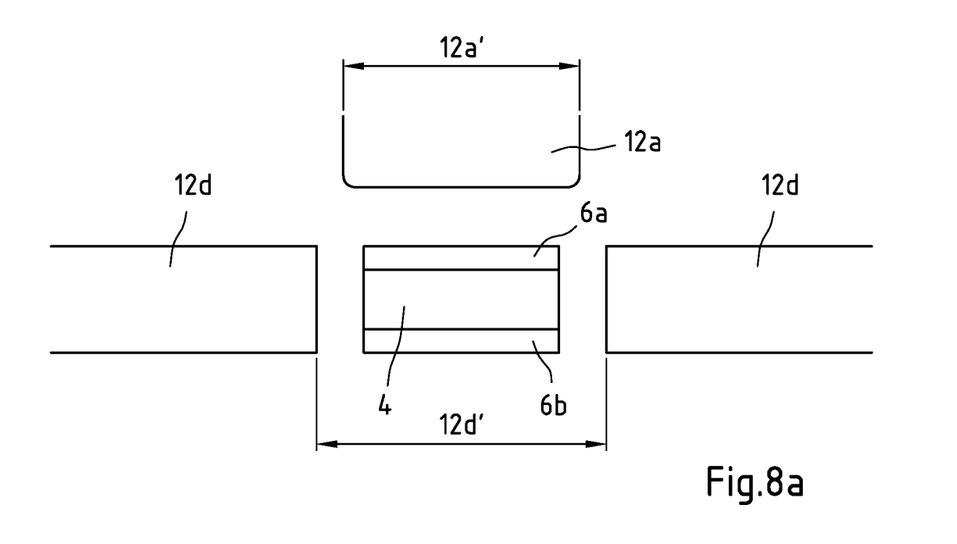
FIG. 8a-b a joining process with lateral limitation of the welding zone.

In ultrasonic welding, a sideshift 12d, as shown in FIG. 8a, can press the reinforcing element 6 and/or the strip 4 against the respective cable 20a, b on two opposite sides. Then the strip 4 can be clamped at the still free sides between a sonotrode and an anvil and the reinforcing element 6, the strip 4 and the end of the conductor 20a, b can be welded by means of ultrasound.

Figure 4:
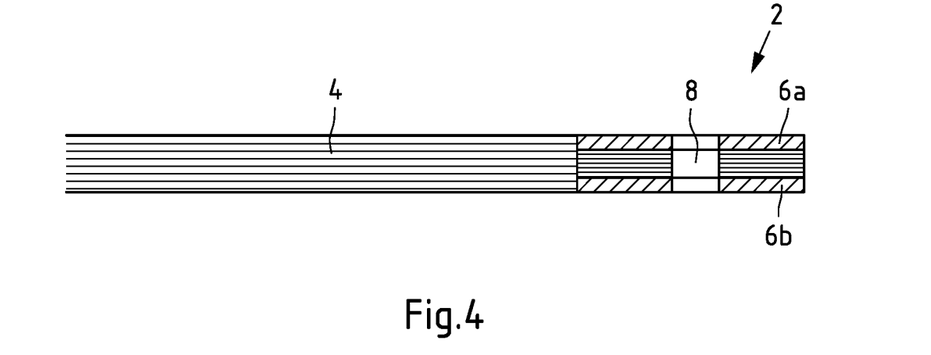
FIG. 4 A longitudinal section of a strip end of a connector.

FIG. 4 shows a longitudinal section through a strip end 2 of a connector 10. Here it can be seen that the receiving element 6 is formed as a through opening by parts 6a, b as well as strip 4.

Figures 5, 6:
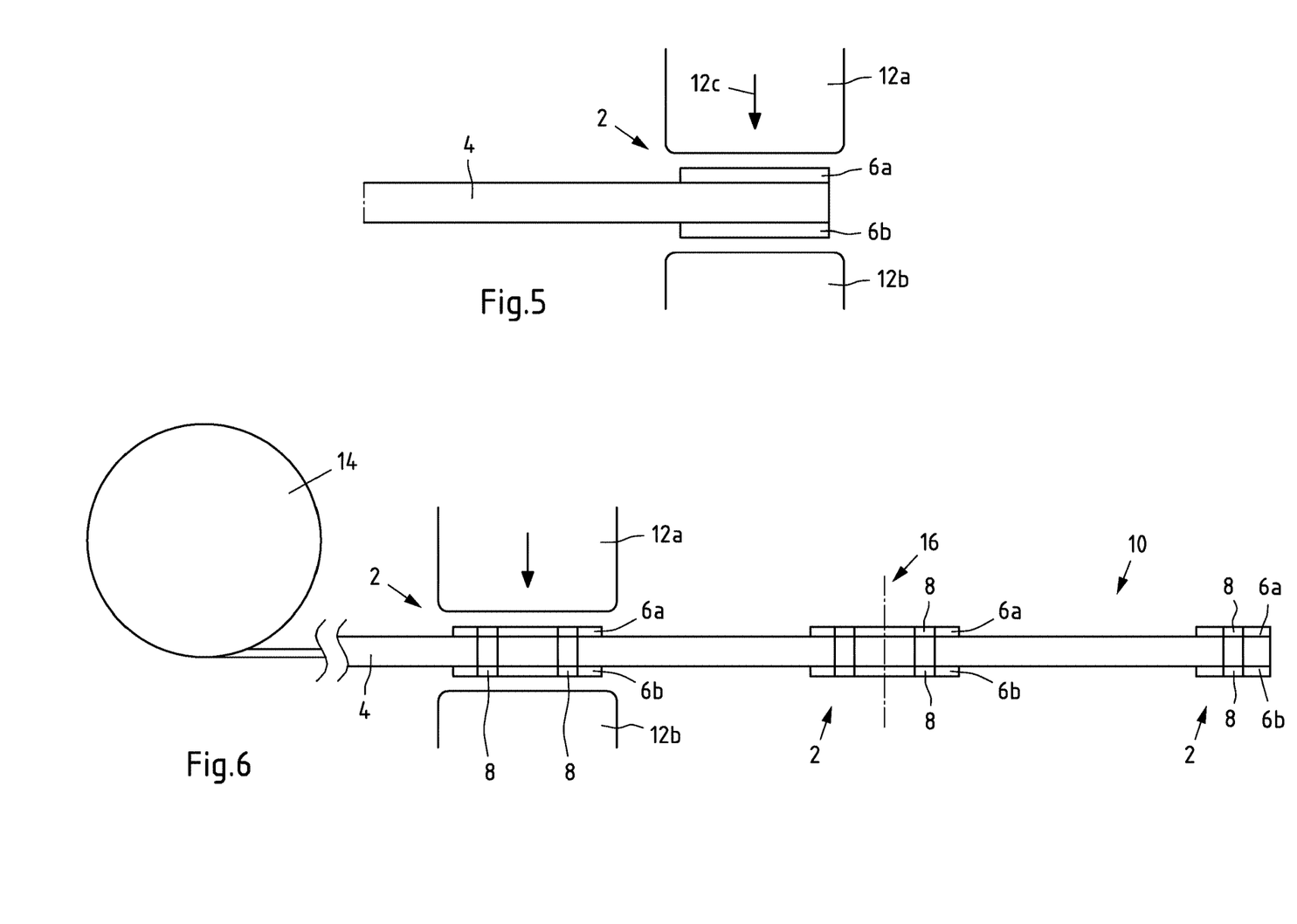
FIG. 5 a schematic view of a joining process.
FIG. 6 a schematic view of a joining process with an endless strip.

FIG. 5 shows a process for joining a strip 4 with parts 6a, b of the reinforcing element 6. For this purpose the end of the strip 2 is moved between a sonotrode 12a and an anvil 12b. Then the sonotrode 12a is pressed in the direction 12c onto the anvil 12b, whereby the strip 4 is compacted with the parts 6a, b and welded by means of ultrasound.

FIG. 6 shows a manufacturing process in which strip 4 is unwound from a reel 14, for example a coil. On the upper and lower sides of strip 4, parts 6a, b are fed and ultrasonically welded to strip 4 using anvil 12b and sonotrode 12a. During this process or afterwards, it is possible to emboss the receiving elements 8 into the end of strip 2, for example by punching or cutting. After the joining process, the strip 4 is transported further and cut along a separating line 16 by means of a separating device. The separating line 16 runs in the middle of the previously applied parts 6a, b, in particular between the two embossed receiving elements 8. Separation along the separating line 16 can also take place immediately after joining, according to the embossing of the receiving element 8.

After cutting along the parting line 16, part 10 is separated and parts 6a, b of the reinforcing element 6 are provided at both ends 2 of part 10. This shows a continuous machining process in which strip 4 is continuously fed and the connectors 10 are separated at the end in such a way that a reinforcing element 6 is formed on both sides of a dividing line 16 on strip 4.

Figure 7:
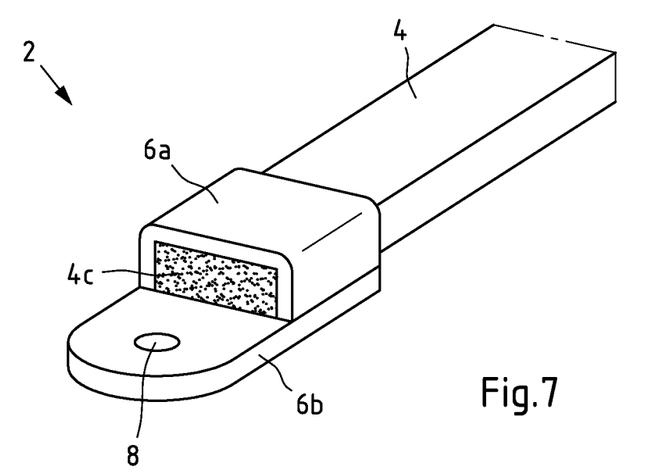
FIG. 7 a view of a strip end of a connector.

FIG. 7 shows a preferred embodiment in which a part 6b protrudes from the end face 4c of strip 4 at the end face 6b. Part 6b is formed as a flat part. Part 6b can be formed as a connecting lug with a mounting element 8. It can be seen that part 6b is formed as a flat part, whereas part 6a is formed as a shell-shaped element for receiving strip 4. This arrangement corresponds approximately to the arrangement shown in FIG. 1b.

FIG. 8a shows the limitation of the welding space. The welding space of the sonotrode 12a is limited by two sideshifters. The sonotrode 12a has a width of 12a'. The sideshifters 12d have a distance of 12d' to each other. The distance 12d' is slightly larger than the distance 12a'. The width of the strip 4 corresponds approximately to the width 12a'. The sideshift 12d thus prevents elements of strip 4 from being pressed out laterally during welding with sonotrode 12a. The distance between the side surfaces of strip 4 and the respective sideshift 12d is preferably less than 1 mm, between 1 and 0.02 mm, in particular 0.04 mm.

Figure 8B:
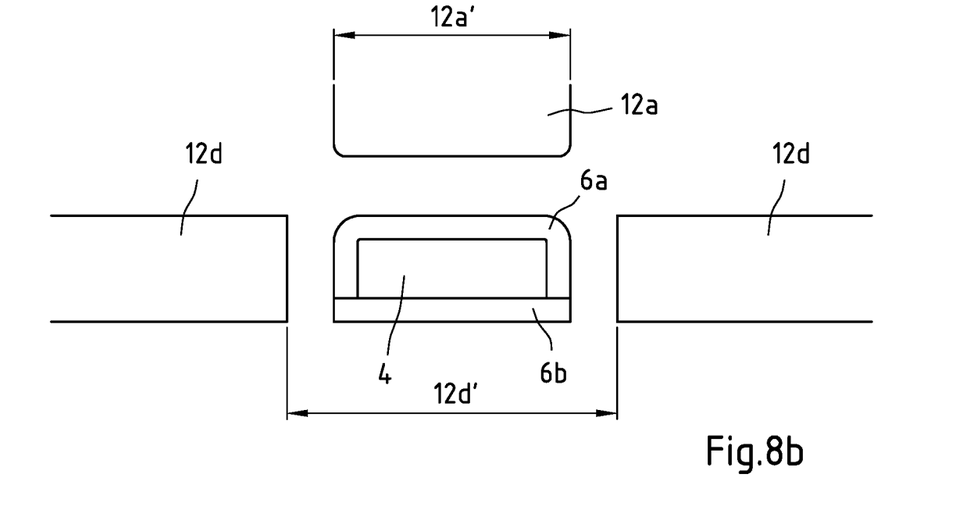

FIG. 8b shows a similar embodiment in which, however, part 6a is formed as a shell-shaped element, whereas part 6b is formed as a flat part. The side shifter 12d prevents the bent edges from being pressed outwards against part 6a when the sonotrode 12 is pressed against part 6a and from slipping off the surface of the flat part 6b if necessary.

In FIG. 8a, b the distance between the side shifters 12d and the edge surfaces of strip 4 or the surface of part 6a is enlarged, but in reality this distance is much smaller in relation to the width of strip 4. In particular, the distance is smaller than the thickness of part 6a.

Figure 9:
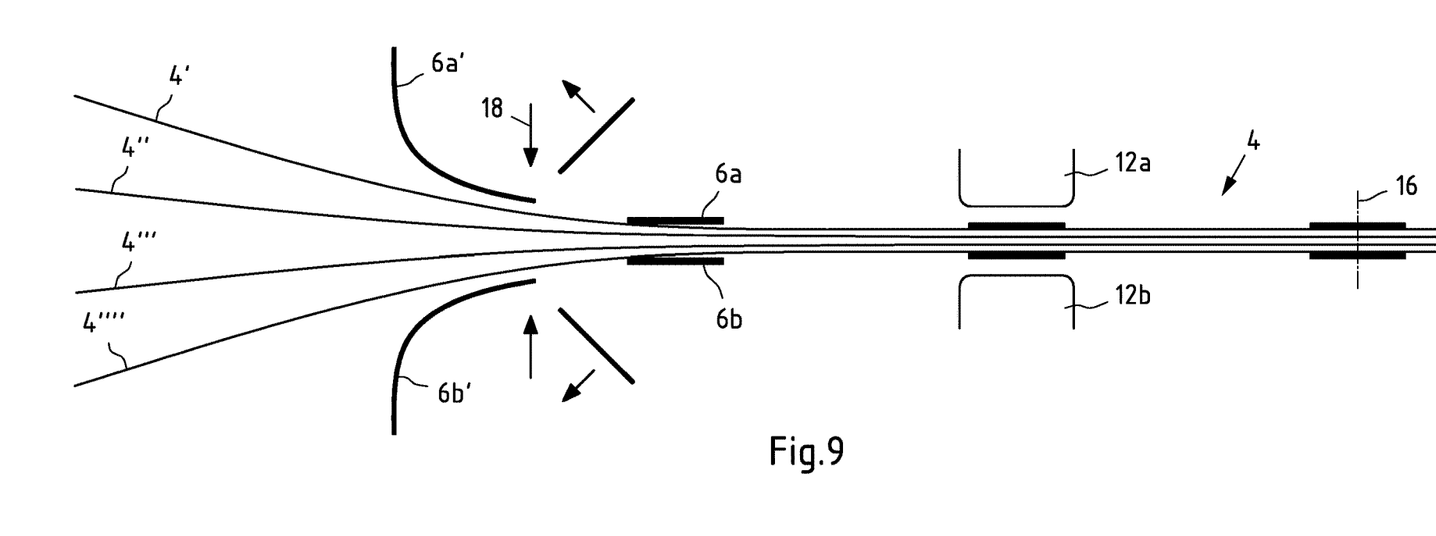
FIG. 9 a continuous joining with simultaneous lamination of a plurality of strips.

FIG. 9 shows another example of a manufacturing process in which both strip 4 and parts 6a, b are laminated onto strip 4 in a continuous process. A majority of 4', 4'',4''',4'''' strips, for example with thicknesses of 0.1 mm and smaller, in particular films, are fed to a laminating process in a continuous process, for example unwound from a roll. At the same time, 6a', b'' strips are applied to the outside of the 4'-4'''' strips.

By a separating device 18 the strips 6a', b' are separated and only in the areas where the reinforcing element 6 is to be formed, parts 6a, b of the strips 6a', b' remain on the laminate of the strips 4'-4''''. First, the strips 6a', b' are fixed to the laminate of the strips 4'-4'''' in the appropriate manner. The strips 4 with the parts 6a, b are then moved into a joining device and pressed onto an anvil 12b using a sonotrode 12a, for example. The parts 6a and b are joined together with the strips 4'-4''''.

Afterwards or at the same time, the strip 4 can be cut along a dividing line 16, as already shown in connection with FIG. 6. Connecting, punching and cutting in FIG. 9 can be carried out according to FIG. 6. In contrast to FIG. 6, however, the strips 4'-4'''' are preferably laminated in a single process and the parts 6a, b are fed from strips 6a', b'.

It goes without saying that the material thicknesses of the 6a', b' strips can be different from the material thicknesses of the 4', 4'' strips. In particular, the material thicknesses can be 5 to 10 times, but also 20 to 100 times, the material thicknesses of the strips 4'-4''. On the other hand, the material thicknesses of the strips 6a', b' can be different from each other.

Figures 10A, 10B:
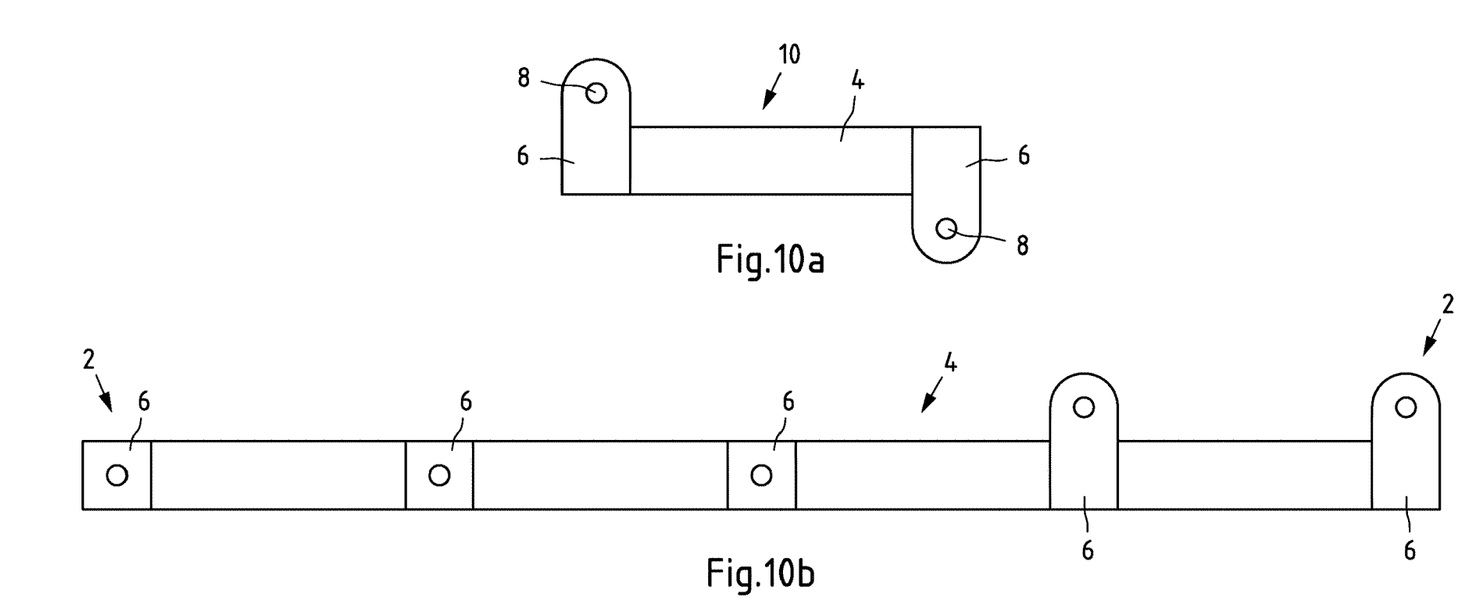
FIG. 10a-c Views of different strips as connectors.

FIG. 10a shows an embodiment of a connector 10 in which the reinforcing elements 6 in the form of connection lugs project beyond the lateral edges of strip 4. The connection elements 8 are provided in the area of the part projecting beyond strip 4. The reinforcing elements 6 can project laterally beyond strip 4 in different directions. It is possible that only part 6a, b of a reinforcing element 6 projects beyond the lateral edge of strip 4.

FIG. 10b shows an example in which a number of reinforcing elements 6 can be provided along the strip 4 between the strip ends 2. The reinforcing elements 6 can be aligned with the width of the strip 4 or, as shown on the right, project beyond a lateral edge of a strip 4. The reinforcing elements 6 arranged at the strip ends 2 can also be differently shaped and, for example, project over a lateral edge of strip 4, over a front edge of strip 4 or lie exclusively on strip 4.

Figure 10C:
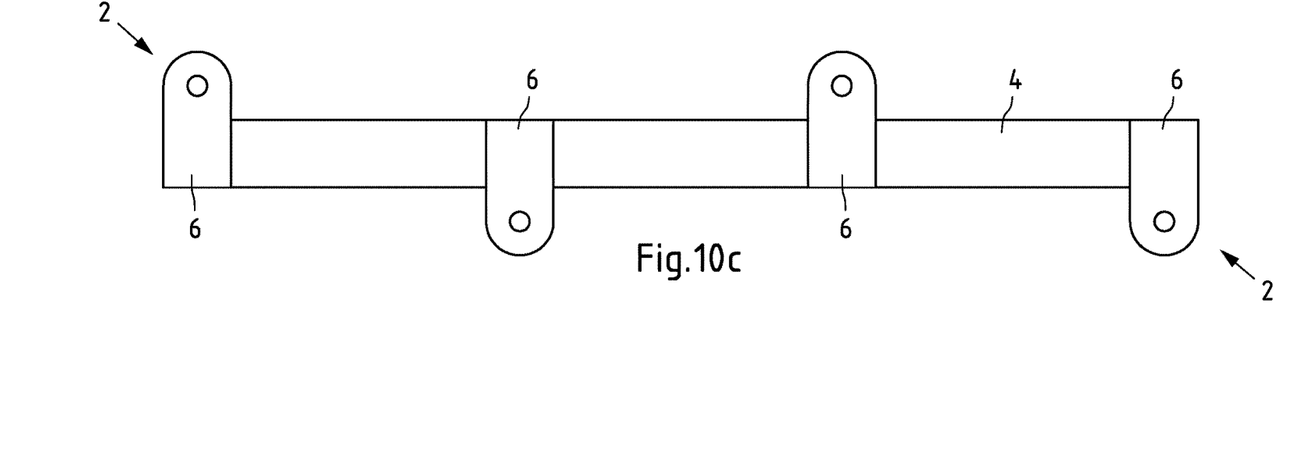

FIG. 10c shows another example in which the reinforcing elements 6 alternately project beyond the lateral edge of strip 4 between strip ends 2.

It goes without saying that further configurations are possible. In particular, the embodiments described here can be freely combined with each other and permutations of features are possible.

REFERENCE SIGNS

2 End of strip
4 Strip
4a Top
4b Underside
4c Front side
4'-4'''' Foils/strips
6a,b Part
6a', 6b' strips
6 Reinforcing element
8 Mounting element
10 connectors
12a Sonotrode
12a' Distance
12b Anvil
12c Direction
12d Sideshift
12d' Distance
14 Roll
16 Separation line
18 Separating device

What is claimed is:

1. A flexible connector comprising:
a multi-layered metallic strip,
the layers of the metallic strip being bonded to one another at at least one end of the strip;
a reinforcing element arranged at the end of the strip, the reinforcing element being bonded to the strip, wherein the reinforcing element is formed from at least two metal sheets, the at least two metal sheets bearing against mutually opposite surfaces of the strip and the metal sheets being bonded with the material of the strip laying in between the sheets forming a single welding knot; and
a flat conductor having an end at least partially embraced by the strip, wherein the strip is welded to the flat conductor together with the reinforcing element.

2. The flexible connector according to claim 1, wherein the multilayer strip is a multilayer laminate or braid.

3. The flexible connector according to claim 1, wherein the strip is formed from copper, a copper alloy, aluminium or an aluminium alloy and in that the reinforcing element is formed from copper, a copper alloy, aluminium or an aluminium alloy.

4. The flexible connector according to claim 1, wherein the reinforcing element is formed from at least one shell-shaped element, and the shell-shaped element accommodates the end of the strip.

5. The flexible connector according to claim 4, wherein the shell-shaped element is bonded along its outer edges to a second metal sheet.

6. The flexible connector according to claim 1, wherein at least part of the reinforcing element projects laterally and/or on the end face beyond the end of the strip.

7. The flexible connector according to claim 1, wherein the reinforcing element is welded to the strip in a central region at a distance from its lateral edges and/or its front edge pointing away from the strip.

8. The flexible connector according to claim 1, wherein the parts of the reinforcing element are not welded at one of its lateral edges and/or its front edge facing away from the strip and/or in that the parts of the reinforcing element are welded to the strip at its front edge facing towards the strip.

9. The flexible connector according to claim 8, wherein the parts of the reinforcing element have sheet thicknesses which differ from one another.

10. The flexible connector according to claim 1, wherein the flexible connector is formed as a plug-in element or as a battery cell connector.

11. The flexible connector according to claim 1, wherein at least part of the reinforcing element is formed as a connecting lug, or in that a connecting lug is bonded to the reinforcing element.

12. The flexible connector according to claim 1, wherein at least one further reinforcing element is arranged between the two distal ends of the strip.

13. The flexible connector according to claim 12, wherein a reinforcing element extends transversely to the longitudinal direction of extension of the strip beyond a lateral edge of the strip.

14. The flexible connector according to claim 13 wherein a reinforcing element extends beyond a first lateral edge and a reinforcing element extends beyond a second lateral edge opposite the first lateral edge.

\* \* \* \* \*